US012718838B2

(12) United States Patent
Chen et al.

(10) Patent No.: US 12,718,838 B2
(45) Date of Patent: Aug. 25, 2026

(54) VOICE DETECTION METHOD, VOICE DETECTION DEVICE, AND COMPUTER DEVICE

(71) Applicant: AAC Technologies (Nanjing) Co., Ltd., Nanjing (CN)

(72) Inventors: Yangzhen Chen, Nanjing (CN); Lijian Ye, Nanjing (CN)

(73) Assignee: AAG Technologies (Nanjing) Co., Ltd., Nanjing (CN)

( * ) Notice: Subject to any disclaimer, the term of this patent is extended or adjusted under 35 U.S.C. 154(b) by 172 days.

(21) Appl. No.: 18/617,602

(22) Filed: Mar. 26, 2024

(65) Prior Publication Data

US 2025/0174246 A1 May 29, 2025

Related U.S. Application Data

(63) Continuation of application No. PCT/CN2023/134703, filed on Nov. 28, 2023.

(51) Int. Cl.
*G10L 25/78* (2013.01)
*G10L 25/09* (2013.01)

(52) U.S. Cl.
CPC .............. *G10L 25/78* (2013.01); *G10L 25/09* (2013.01)

(58) Field of Classification Search
CPC .......... G10L 25/78; G10L 25/09; G10L 25/84
See application file for complete search history.

(56) References Cited

U.S. PATENT DOCUMENTS 6,560,575 B1 * 5/2003 Keiller .................... G10L 17/04 704/239
10,360,905 B1 * 7/2019 Pereira ............ G06V 30/18086
11,823,706 B1 * 11/2023 Yang ....................... G10L 15/02
2001/0008995 A1 * 7/2001 Kim ........................ G10L 19/12 704/223
2009/0271190 A1 * 10/2009 Niemisto ................ G10L 25/78 704/E15.001
2013/0204617 A1 * 8/2013 Kuo ................. G10K 11/17885 704/233
2015/0243300 A1 * 8/2015 Muesch .................. G10L 25/78 704/226
2016/0364963 A1 * 12/2016 Matsuoka ............ G06V 10/764
2017/0154636 A1 * 6/2017 Geiger ................ G10L 21/0316
2019/0385636 A1 * 12/2019 Li ........................... G10L 15/02
2022/0254350 A1 * 8/2022 Guo ........................ G10L 17/02

* cited by examiner

*Primary Examiner* — Shaun Roberts
(74) *Attorney, Agent, or Firm* — Wiersch Law Group

(57) ABSTRACT

A voice detection method, a voice detection device, and a computer device are provided. The voice detection method includes acquiring an audio sequence; extracting a first audio feature from the audio sequence, and performing voice detection on the audio sequence according to the first audio feature to obtain a first voice detection result; extracting a second audio feature from the audio sequence and performing the voice detection on the audio sequence according to the second audio feature to obtain a second voice detection result; and determining a voice detection result of the audio sequence according to the first voice detection result and the second voice detection result. The voice detection method realizes voice detection in a non-training way and has low computing power and high detection accuracy.

3 Claims, 8 Drawing Sheets

VOICE DETECTION METHOD, VOICE DETECTION DEVICE, AND COMPUTER DEVICE

TECHNICAL FIELD

The present disclosure relates to a field of voice detection technology, and in particular to a voice detection method, a voice detection device, and a computer device.

BACKGROUND

Voice activity detection (VAD) is widely used in voice processing such as call noise reduction, intelligent voice, voiceprint segmentation and clustering, and voice coding. The VAD is capable of distinguishing between silent segments and voice segments in audio streams, but is unable to distinguish between music segments and voice segments in the audio streams. However, distinguishing between music and voice also has strong application requirements. For example, a first application is to encode the music segments and the voice segments differently to realize a balance between transmission efficiency and audio quality. A second application is to detect a presence of voice from an audio stream in real time and respond to a detection result thereof. If a conventional VAD method is used, some music, musical instrument sounds, and transient noise may be misjudged, which leads to execution of erroneous instructions.

A conventional voice detection solution is generally based on an energy, a zero-crossing rate, a spectral entropy, and other features of audio sequences, making it difficult to detect voice segments from the audio sequences having musical background sounds. A current VAD method based on deep learning is allowed to distinguish the music, the voice, silence, and background noise very well due to its automatic learning ability of features of the audio sequences. However, when executing the current VAD method, a large amount of training data and model parameters are needed, because an effect of using a small model is not ideal and judgments on unknown data are not effective.

SUMMARY

The present disclosure provides a voice detection method, a voice detection device, and a computer device, which realize voice detection in a non-training way and have low computing power and high detection accuracy.

To solve above technical problems, the present disclosure provides the voice detection method. The voice detection method includes steps:

acquiring an audio sequence;

extracting a first audio feature from the audio sequence, and performing voice detection on the audio sequence according to the first audio feature to obtain a first voice detection result;

extracting a second audio feature from the audio sequence, and performing the voice detection on the audio sequence according to the second audio feature to obtain a second voice detection result; and determining a voice detection result of the audio sequence according to the first voice detection result and the second voice detection result.

In one optional embodiment, the first audio feature includes an average energy, an energy ratio, and a zero-crossing rate of audio signal. The step of extracting the first audio feature from the audio sequence and performing the voice detection on the audio sequence according to the first audio feature to obtain the first voice detection result includes steps:

performing sampling frequency conversion and framing processing on the audio sequence to obtain frames of audio sub-signals;

calculating an average energy and an zero-crossing rate of each of the frames of the audio sub-signals according to each of the frames of the audio sub-signals to obtain the average energy and the zero-crossing rate of the audio signal;

obtaining energy spectra of the audio sub-signals, obtaining low-frequency band energy and high-band energy according to the energy spectra, and calculating a ratio between an average energy of the low-frequency band energy and an average energy of the high-band energy to obtain the energy ratio of the audio signal; and performing the voice detection on the audio sequence according to the average energy, the zero-crossing rate and the energy ratio of the audio signal to obtain the first voice detection result.

In one optional embodiment, the step of obtaining the energy spectra of the audio sub-signals and obtaining the low-frequency band energy and the high-band energy according to the energy spectra includes steps:

obtaining the low-frequency band energy and the high-frequency band energy from a frequency domain through fast Fourier transform; or respectively obtaining a low-frequency signal and a high-frequency signal through a time-domain filter and a predetermined cut-off frequency, and calculating the low-frequency band energy of the low-frequency signal and the high-frequency band of the high-frequency signal.

The step of obtaining the low-frequency band energy and the high-frequency band energy from the frequency domain through the fast Fourier transform includes:

performing windowing processing on each of the frames of the audio sub-signals to obtain windowing processing results;

respectively performing the fast Fourier transform on the windowing processing results to obtain fast Fourier transform results;

respectively calculating the energy spectra according to the fast Fourier transform results; and counting the high-frequency band energy and the low-frequency band energy from the energy spectra.

In one optional embodiment, the step of performing the voice detection on the audio sequence according to the average energy, the zero-crossing rate, and the energy ratio of the audio signal to obtain the first voice detection result includes comparing the average energy of the audio signal with a first predetermined threshold;

comparing the energy ratio of the audio signal with a second predetermined threshold;

comparing the zero-crossing rate of the audio signal with a third predetermined threshold; and determining that the first voice detection result is a voice when the average energy of the audio signal is greater than the first predetermined threshold, the energy ratio of the audio signal is greater than the second predetermined threshold, and the zero-crossing rate of the audio signal is greater than the third predetermined threshold.

In one optional embodiment, the second feature includes a spectral modulation energy. The step of extracting the second audio feature from the audio sequence and performing the voice detection on the audio sequence according to the second audio feature to obtain the second voice detection result includes steps:

performing the sampling frequency conversion and segmentation processing on the audio sequence to obtain audio segments;

calculating a Mel spectrum for each of the audio segments to obtain a Mel spectrogram containing channels;

performing the fast Fourier transform on each of the channels in the Mel spectrogram, and calculating a normalized modulation energy of each of the channels; and performing the voice detection on the audio sequence according to the normalized modulation energy of each of the channels to obtain the second voice detection result.

In one optional embodiment, the step of performing the voice detection on the audio sequence according to the normalized modulation energy of each of the channels to obtain the second voice detection result includes steps:

calculating a sum of the normalized modulation energy of each of the channels;

comparing the sum of the normalized modulation energy of each of the channels with a fourth predetermined threshold;

if the sum of the normalized modulation energy of each of the channels is greater than the fourth predetermined threshold, determining that the second voice detection result is the voice; and if the sum of the normalized modulation energy of each of the channels not greater than the fourth predetermined threshold, determining that the second voice detection result is non-voice.

In one optional embodiment, the step of determining the voice detection result of the audio sequence according to the first voice detection result and the second voice detection result includes steps:

determining whether both of the first voice detection result and the second voice detection result are voice;

if yes, determining that the voice detection result of the audio sequence is the voice; and if no, determining that the voice detection result of the audio sequence is non-voice.

To solve the above technical problems, the present disclosure further provides the voice detection device. The voice detection device includes an acquiring module, a first audio feature extraction module, a second audio feature extraction module, and a voice detection module.

The acquisition module is configured to acquire an audio sequence. The first audio feature extraction module is configured to extract a first audio feature from the audio sequence, and perform voice detection on the audio sequence according to the first audio feature to obtain a first voice detection result.

The second audio feature extraction module is configured to extract a second audio feature from the audio sequence and perform the voice detection on the audio sequence according to the second audio feature to obtain a second voice detection result.

The voice detection module is configured to determine a voice detection result of the audio sequence according to the first voice detection result and the second voice detection result.

To solve the above technical problems, the present disclosure further provides a computer device. The computer device includes a memory, a processor, and a computer program. The computer program is stored in the memory and is executable on the processor. The processor implements the voice detection method when executing the computer program.

In the present disclosure, the voice detection method is a non-training method. By acquiring the audio sequence, extracting the first audio feature from the audio sequence, by performing the voice detection on the audio sequence according to the first audio feature to obtain the first voice detection result, by extracting the second audio feature from the audio sequence and performing the voice detection on the audio sequence according to the second audio feature to obtain the second voice detection result, and by determining the voice detection result of the audio sequence according to the first voice detection result and the second voice detection result, the voice detection is performed in steady-state noise, transient noise, and music rather than using a training method based on deep learning. Therefore, it is unnecessary to acquire a large amount of training data in the voice detection method of the present disclosure, and the voice detection method is executable under a low hashrate and has high detection accuracy.

DETAILED DESCRIPTION

Figure 1:
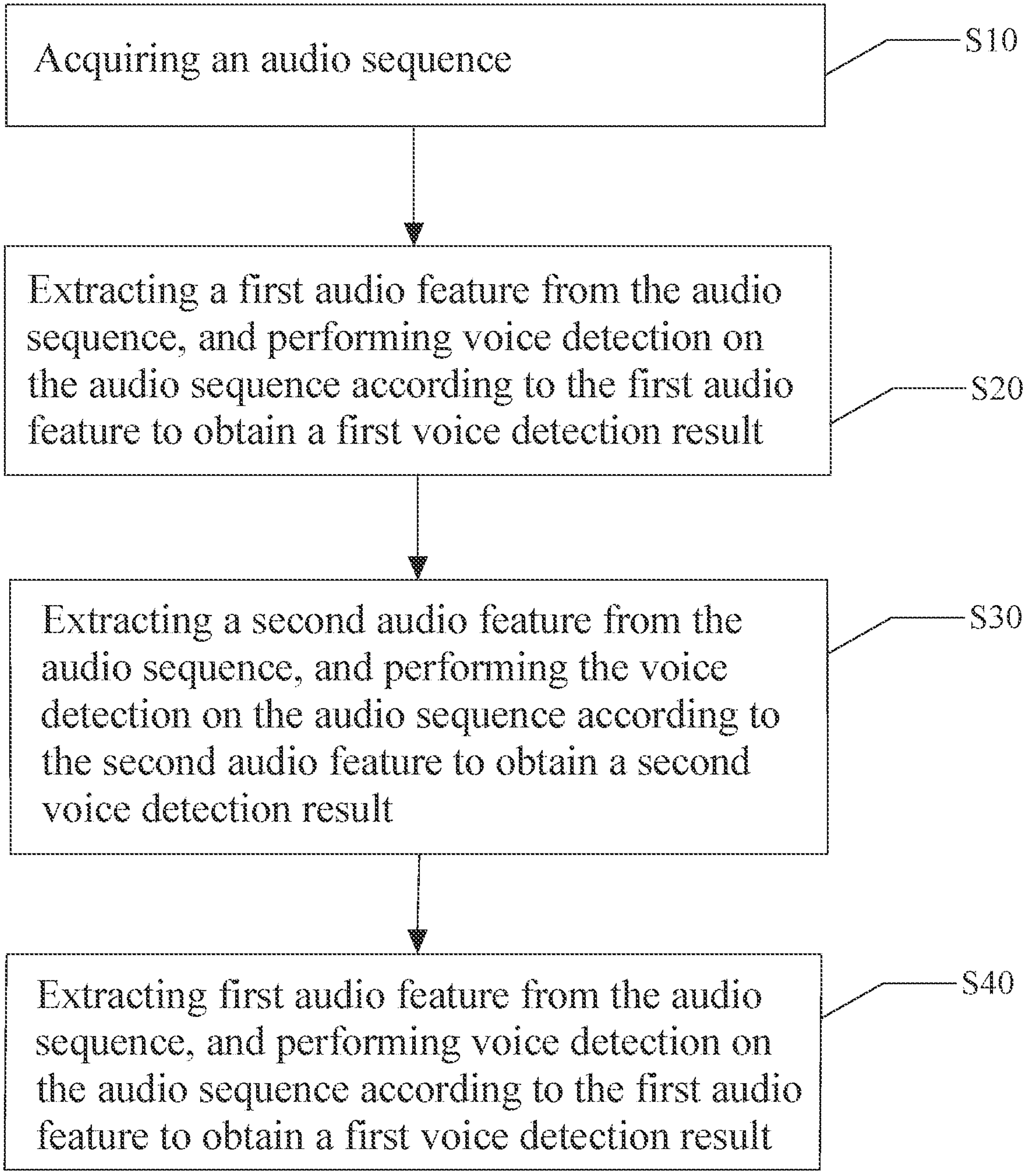
FIG. 1 is a schematic flow chart of a voice detection method according to one embodiment of the present disclosure.

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

In the description of the present disclosure, terms such as "first", "second", and "third" are only used for the purpose of description, rather than being understood to indicate or imply relative importance or hint the number of indicated technical features. Thus, the feature limited by “first”, “second”, and “third” can explicitly or impliedly include at least one feature. In the description of the present disclosure, the meaning of “a plurality of” is at least two, e.g., two or three, or more unless otherwise specified. All directional indications (such as up, down, left, right, front, back . . . ) in the embodiments of the present disclosure are only used to explain the relationship, relative positional relationship, movement conditions, etc., between the components in a specific posture (as shown in the drawings), if the specific posture changes, the directional indications change accordingly. In addition, terms “include”, “include”, and any variations thereof are intended to cover non-exclusive inclusion, e.g., includes a series of steps or units, processes, methods, systems, products, or devices, which are not limited to the listed steps or units, but may optionally further include steps or units not listed, or optionally further includes steps or units inherent to the processes, methods, products, or devices. Reference herein to “embodiment” means that a particular feature, structure, or characteristic described in connection with one embodiment may be included in at least one embodiment of the present disclosure. The appearances of the “embodiment” in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

FIG. 1 is a schematic flow chart of a voice detection method according to one embodiment of the present disclosure. It should be noted that, if substantially the same results are obtained, the voice detection method of the present disclosure is not limited to a process sequence shown in FIG. 1. As shown in FIG. 1, the voice detection method includes steps S10-S40.

The step S10 includes acquiring an audio sequence.

In the step S10, the audio sequence includes voice signals including one or more of background noise, music, and a voice. The background noise includes steady-state noise and/or transient noise. For example, the audio sequence includes the background noise, the music, and the voice. For another example, the audio sequence includes the background noise and the voice. For another example, the audio sequence includes the music and the voice. For another example, the audio sequence includes the background noise and/or the music.

The step S20 includes extracting a first audio feature from the audio sequence, and performing voice detection on the audio sequence according to the first audio feature to obtain a first voice detection result.

In the step S20, the first audio feature includes an average energy, an energy ratio, and a zero-crossing rate of the audio signal. The voice is detected from the steady-state noise through the first audio feature. The first voice detection result includes two results, a first result therein is that the audio sequence is the voice, and a second result therein is that the audio sequence is non-voice.

Figure 2:
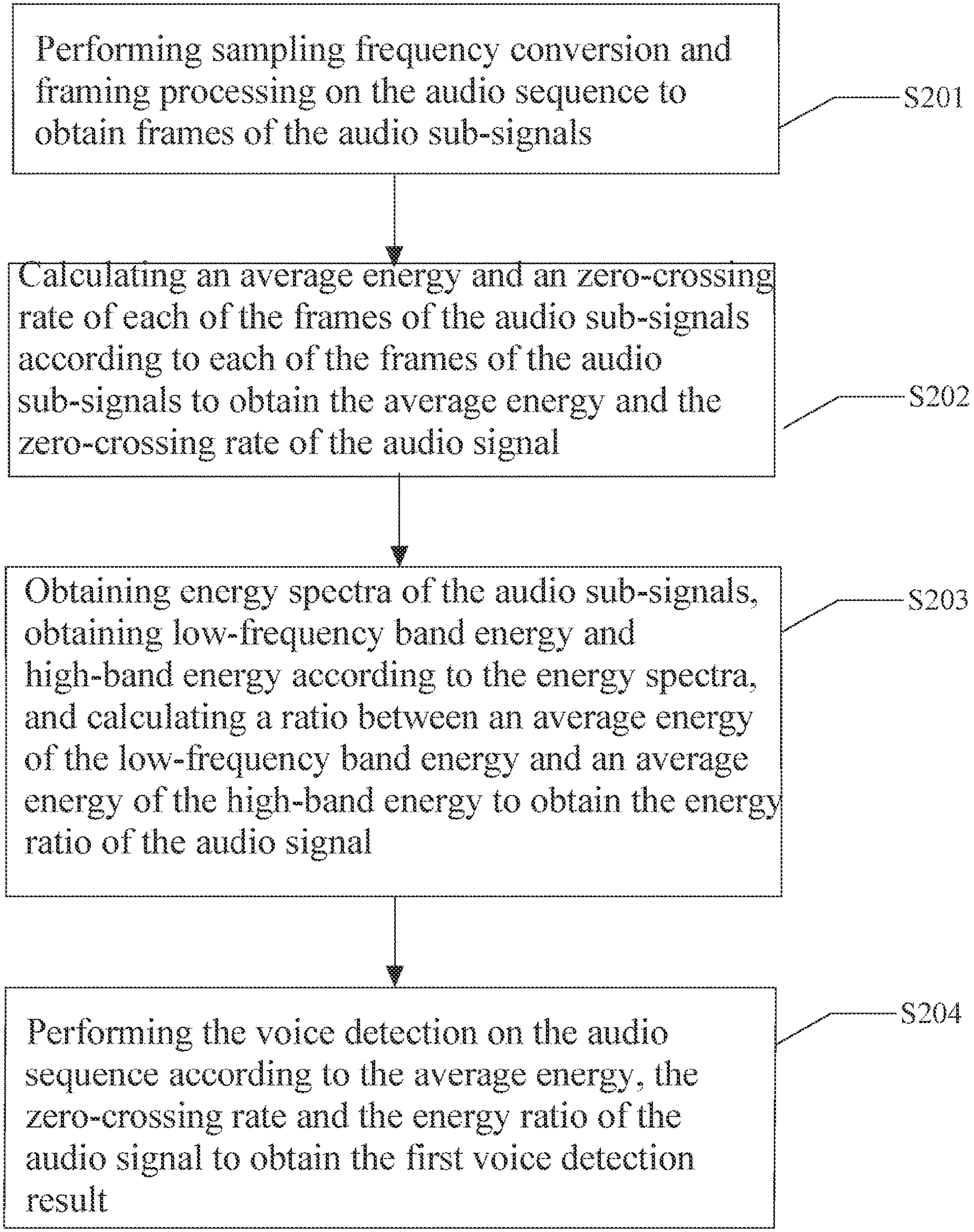
FIG. 2 is a schematic flow chart of step S20 of the voice detection method according to one embodiment of the present disclosure.
Figure 3:
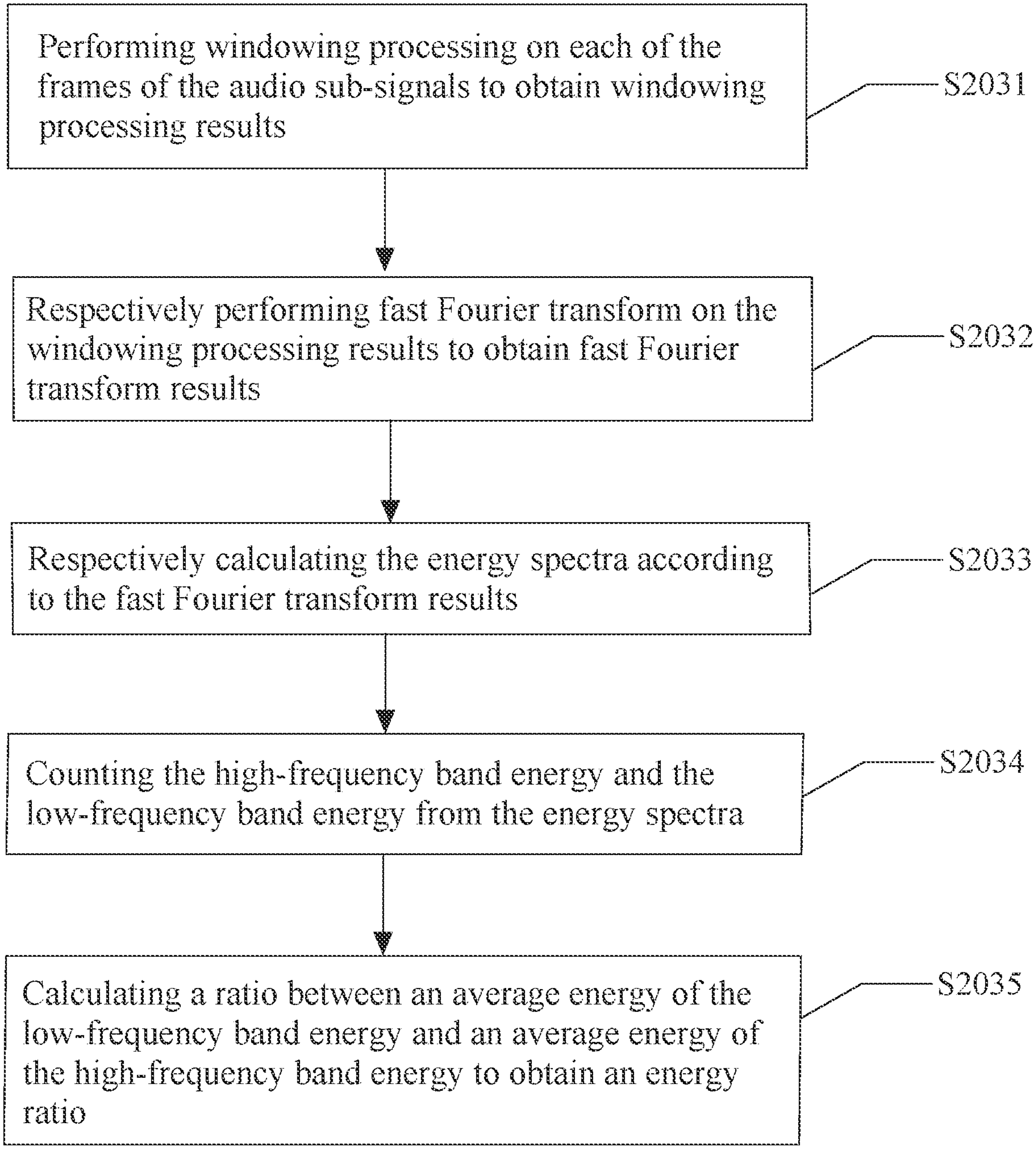
FIG. 3 is a schematic flow chart of step S203 of the voice detection method according to one embodiment of the present disclosure.

As shown in FIG. 2, in one optional embodiment, the step S20 includes steps S201-S204.

The step S201 includes performing sampling frequency conversion and framing processing on the audio sequence to obtain frames of the audio sub-signals.

Specifically, a sampling frequency of the audio sequence is converted to 8 kHz to obtain a processed audio sequence, framing processing is performed on the processed audio sequence. There are 256 sample points in each of the frames, and the frames are not overlapped with each other, thereby obtaining the frames of the audio sub-signals.

The step S202 includes calculating an average energy and an zero-crossing rate of each of the frames of the audio sub-signals according to each of the frames of the audio sub-signals to obtain the average energy and the zero-crossing rate of the audio signal Specifically, the average energy of each of the frames of the audio sub-signals is calculated according to following formula:

$$\text{energy }(k)=\frac{1}{256}\sum_{i=1}^{256}x_k(i)^2.$$

$x_k$ is a first audio signal of a $k^{th}$ frame with a length of 256, i is a quantity of the sample points, and energy(k) is the average energy of the first audio signal of the $k^{th}$ frame.

The zero-crossing rate of each of the frames of the audio sub-signals is calculated according to following formula:

$$zcr=\text{mean}(\text{abs}(diff(\text{sign}(inputFrame)))).$$

Zcr is the zero-crossing rate thereof. mean, abs, diff, and sign are respectively an averaging function, an absolute value function, a difference function, and a sign function of a matlab program. inputFrame is one of the frames of the audio sub-signals, and a length thereof is a frame length.

The step S203 includes obtaining energy spectra of the audio sub-signals, obtaining low-frequency band energy and high-band energy according to the energy spectra, and calculating a ratio between an average energy of the low-frequency band energy and an average energy of the high-band energy to obtain the energy ratio of the audio signal.

Specifically, a low-frequency band is in a range of 200 Hz~1000 Hz, and a high-frequency band is in a range of 1000 Hz~4000 Hz. In the embodiment, the low-frequency band energy and the high-frequency band energy are obtained from a frequency domain through fast Fourier transform. Alternatively, a low-frequency signal and a high-frequency signal are respectively obtained through a time-domain filter and a predetermined cut-off frequency, and the low-frequency band energy of the low-frequency signal and the high-frequency band of the high-frequency signal are calculated.

The step of obtaining the low-frequency band energy and the high-frequency band energy from the frequency domain through fast Fourier transform includes steps S2031-S2034.

The step S2031 includes performing windowing processing on each of the frames of the audio sub-signals to obtain windowing processing results.

Specifically, the windowing processing is to multiply each of the frames of the audio sub-signals by a Hanning window, which increase a continuity between a left end and a right end of each of the frames. The Hanning window effectively reduces signal leakage during the windowing processing. Windowed audio signal are converted into energy distribution in the frequency domain, and different energy distributions represent characteristics of different voices.

The step S2032 includes respectively performing fast Fourier transform on the windowing processing results to obtain fast Fourier transform results.

Specifically, fast Fourier transform is performed on the windowing processing results to obtain frequency spectra.

The step S2033 includes respectively calculating the energy spectra according to the fast Fourier transform results.

Specifically, the energy spectra are energy spectral density, which characterizes a distribution of energy of signals or time series with frequency. In one embodiment, an energy spectrum of each of the frames of the audio sub-signals is the square of a corresponding fast Fourier transform result.

The step S2034 includes counting the high-frequency band energy and the low-frequency band energy from the energy spectra.

The step S2035 includes calculating a ratio between an average energy of the low-frequency band energy and an average energy of the high-frequency band energy to obtain an energy ratio.

Specifically, the average energy of the low-frequency band energy and the average energy of the high-frequency band energy are calculated first, and then the ratio between the average energy of the low-frequency band energy and the average energy of the high-frequency band energy is calculated to obtain the energy ratio.

The step S204 includes performing the voice detection on the audio sequence according to the average energy, the zero-crossing rate and the energy ratio of the audio signal to obtain the first voice detection result.

Specifically, in the step S204, the average energy of the audio signal is compared with a first predetermined threshold, the energy ratio of the audio signal is compared with a second predetermined threshold, and the zero-crossing rate of the audio signal is compared with a third predetermined threshold. It is determined that the first voice detection result is that the audio sequence is the voice, when the average energy of the audio signal is greater than the first predetermined threshold, the energy ratio of the audio signal is greater than the second predetermined threshold, and the zero-crossing rate of the audio signal is greater than the third predetermined threshold.

Figure 4:
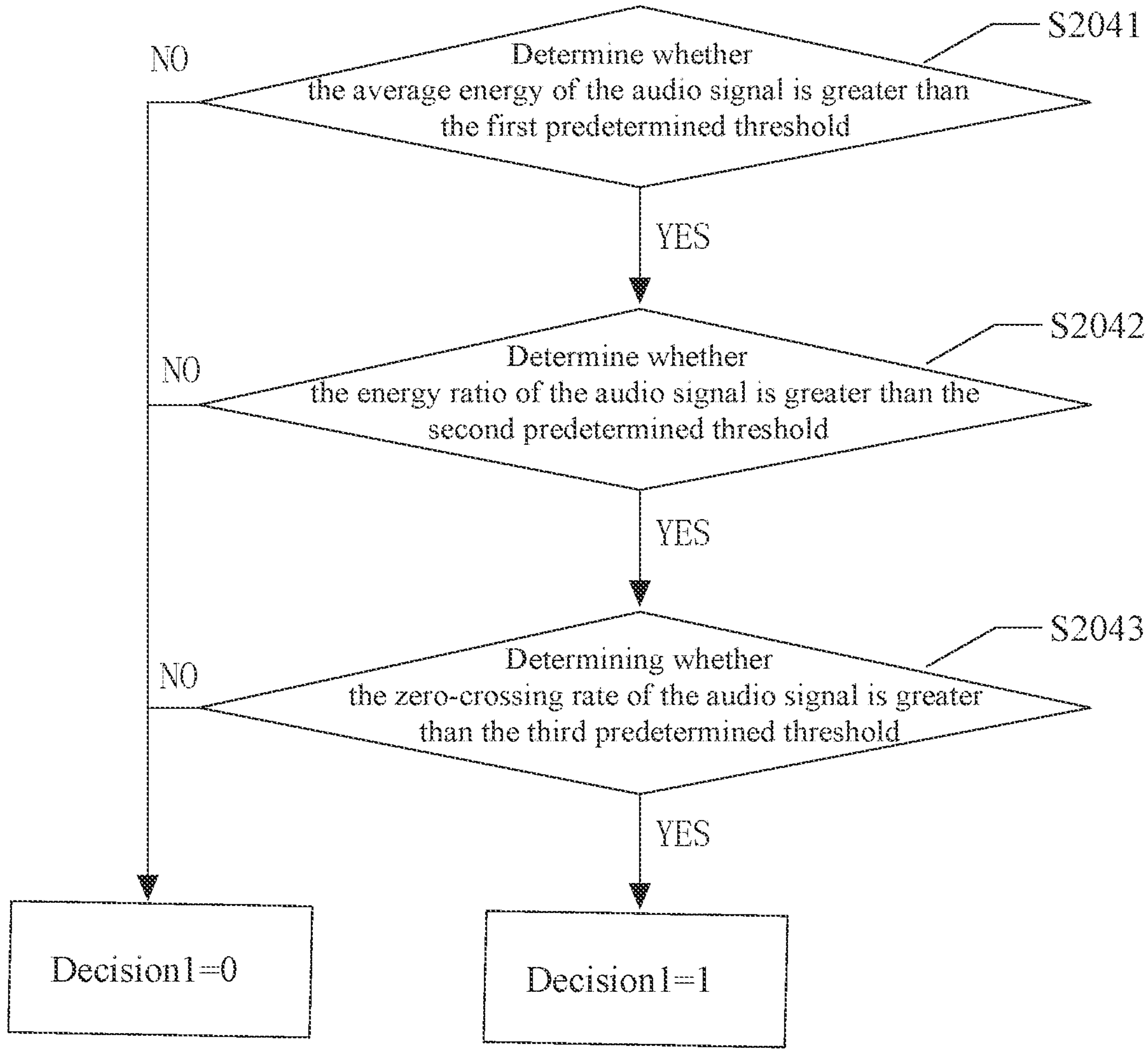
FIG. 4 is a schematic flow chart of step S204 of the voice detection method according to one embodiment of the present disclosure.

Otherwise, the first voice detection result is that the audio sequence is non-voice. The first predetermined threshold, the second predetermined threshold, and the third predetermined threshold in the embodiment are adjustable according to different application scenarios, and may be fixed values or numerical ranges. For example, as shown in FIG. 4, a step S2041 is executed first. The step S2041 includes determining whether the average energy of the audio signal is greater than the first predetermined threshold. If yes, a step S2042 is executed. The step S2042 includes determine whether the energy ratio of the audio signal is greater than the second predetermined threshold. If yes, a step S2043 is executed. The step S2043 includes determining whether the zero-crossing rate of the audio signal is greater than the third predetermined threshold. If yes, output "Decision1=1". After the step S2041, if not, output "Decision1=0". After step S2042, if not, output "Decision1=0". After step S2043, if the average energy of the audio signal is not greater than the first predetermined threshold, output "Decision1=0". In the embodiment, "Decision1=1" indicates that the first voice detection result is that the audio sequence is the voice, and "Decision1=0" indicates that the first voice detection result is that the audio sequence is non-voice.

The step S30 includes extracting a second audio feature from the audio sequence, and performing the voice detection on the audio sequence according to the second audio feature to obtain a second voice detection result.

In the step S30, the second audio feature includes spectrum modulation energy, such as 2 Hz~9 Hz spectrum modulation energy. In the embodiment, the voice is detected from the transient noise and the music through the second audio feature. The second voice detection result includes two results, a first result thereof is that the audio sequence is the voice, and a second result thereof is that the audio sequence is non-voice.

Figure 5:
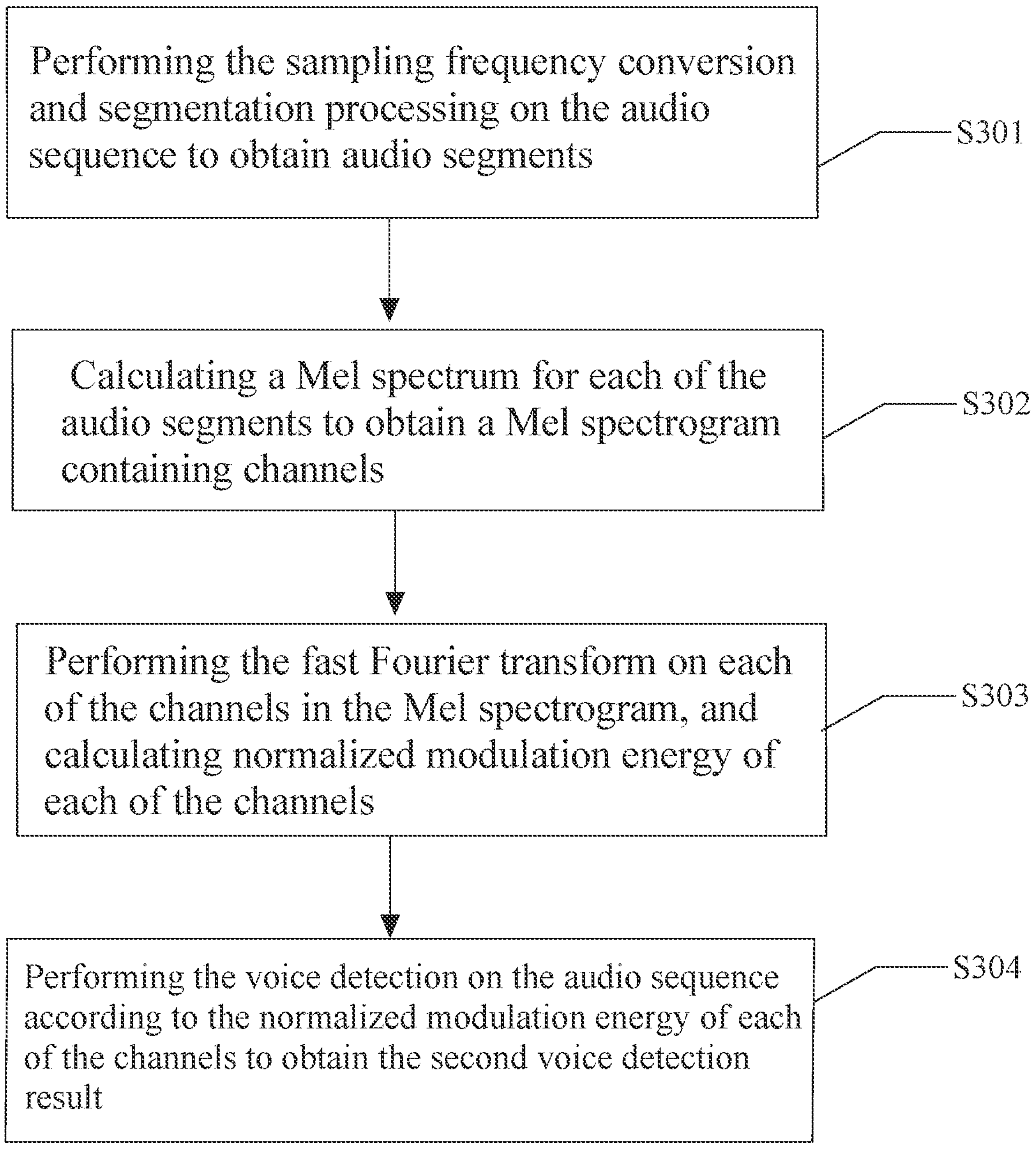
FIG. 5 is a schematic flow chart of step S30 of the voice detection method according to one embodiment of the present disclosure.

In one optional embodiment, as shown in FIG. 5, the step S30 includes steps S301-S304.

The step S301 includes performing the sampling frequency conversion and segmentation processing on the audio sequence to obtain audio segments.

Specifically, the sampling frequency of the audio sequence is converted to 8 kHz to obtain the processed audio sequence, and the processed audio signal is divided into the audio segments. A length of each of the audio segment is 1.022 s (i.e., 8176 sample points under the sampling frequency of 8 kHz), and a step is 10 ms (i.e., 80 sample points under the sampling frequency of 8 kHz).

The step S302 includes calculating a Mel spectrum for each of the audio segments to obtain a Mel spectrogram containing channels.

Specifically, each of the audio segments is subjected to windowing processing and the fast Fourier transform to obtain a corresponding Mel spectrum. A window length thereof is 256 (32 ms), and a window function thereof is the Hanning window. The Hanning window effectively reduces signal leakage during the windowing processing. A length of the fast Fourier transform is 256, an overlap length is 256−80=176, a quantity of the channels is 40, and the Mel spectrogram is a matrix of (40,100).

The step S303 includes performing the fast Fourier transform on each of the channels in the Mel spectrogram, and calculating a normalized modulation energy of each of the channels.

Specifically, the fast Fourier transform is performed on each of the channels in the Mel spectrogram, and a ratio of the spectrum modulation energy of 2-9 Hz to total energy is calculated to obtain the normalized modulation energy of 2-9 Hz for each of the channels.

The step S304 includes performing the voice detection on the audio sequence according to the normalized modulation energy of each of the channels to obtain the second voice detection result.

Specifically, a comprehensive judgment decision is made based on the normalized modulation energy of 2-9 Hz of 40 channels. In one optional embodiment, a sum of the normalized modulation energy of the channels is calculated. A calculation result thereof is compared with a fourth predetermined threshold. If the calculation result is greater than the fourth predetermined threshold, it is determined that the second voice detection result is that the audio sequence is the voice. If the calculation result is not greater than the fourth predetermined threshold, it is determined that the second voice detection result is that the audio sequence is non-voice.

The step S40 includes determining a voice detection result of the audio sequence according to the first voice detection result and the second voice detection result.

Specifically, the step S40 includes determining whether both of the first voice detection result and the second voice detection result are voice; if yes, determining that the voice detection result of the audio sequence is a voice; and if no, determining that the voice detection result of the audio sequence is non-voice.

For example, if the first voice detection result is that the audio sequence is the voice, and the second voice detection result is that the audio sequence is the voice, then it is determined that the voice detection result is that the audio sequence is the voice. Alternatively, if the first voice detection result is that the audio sequence is the voice, and the second voice detection result is that the audio sequence is non-voice, then it is determined that the voice detection result is that the audio sequence is non-voice. Alternatively, if the first voice detection result is that the audio sequence is non-voice, and the second voice detection result is that the audio sequence is the voice, then it is determined that the voice detection result is that the audio sequence is non-voice. Alternatively, if the first voice detection result is that the audio sequence is non-voice, and the second voice detection result is that the audio sequence is non-voice, then it is determined that the voice detection result is that the audio sequence is non-voice.

In the present disclosure, the voice detection method is a non-training method. By acquiring the audio sequence, extracting the first audio feature from the audio sequence, by performing the voice detection on the audio sequence according to the first audio feature to obtain the first voice detection result, by extracting the second audio feature from the audio sequence and performing the voice detection on the audio sequence according to the second audio feature to obtain the second voice detection result, and by determining the voice detection result of the audio sequence according to the first voice detection result and the second voice detection result, the voice detection is performed in the steady-state noise, the transient noise, and the music rather than using a training method based on deep learning. Therefore, it is unnecessary to acquire a large amount of training data in the voice detection method of the present disclosure, and the voice detection method is executable under a low hashrate and has high detection accuracy.

Figure 6:
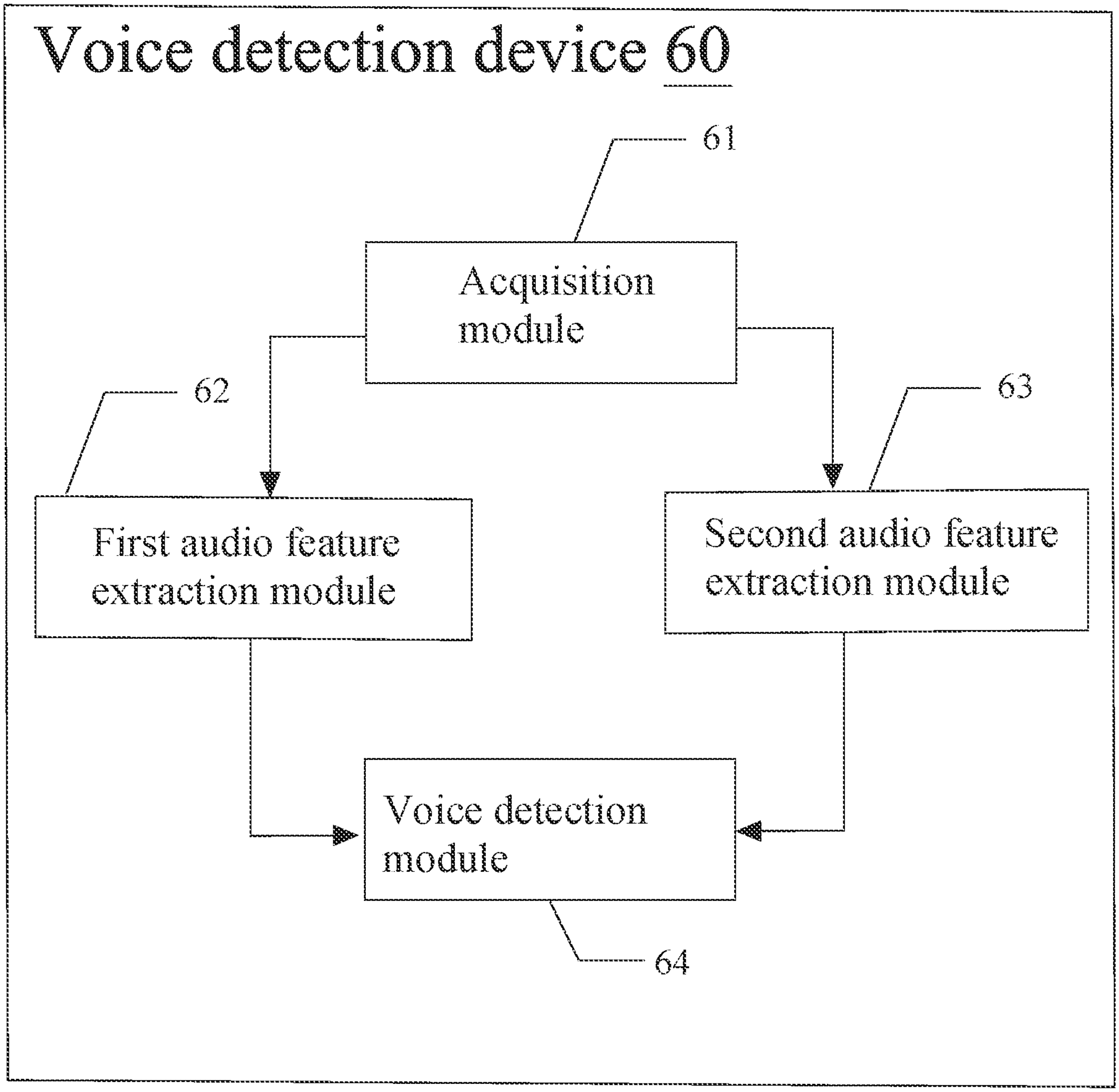
FIG. 6 is a schematic structural diagram of a voice detection device according to one embodiment of the present disclosure.

The present disclosure further provides a voice detection device 60. As shown in FIG. 6, the voice detection device 60 includes an acquisition module 61, a first audio feature extraction module 62, a second audio feature extraction module 63, and a voice detection module 64.

The acquisition module 61 is configured to acquire an audio sequence. The first audio feature extraction module 62 is coupled to the acquisition module 61. The first audio feature extraction module 62 is configured to extract a first audio feature from the audio sequence, and perform voice detection on the audio sequence according to the first audio feature to obtain a first voice detection result.

The second audio feature extraction module 63 is coupled to the acquisition module 61. The second audio feature extraction module 63 is configured to extract a second audio feature from the audio sequence and perform the voice detection on the audio sequence according to the second audio feature to obtain a second voice detection result.

The voice detection module 64 is coupled to the first audio feature extraction module 62 and the second audio feature extraction module 63. The voice detection module 64 is configured to determine a voice detection result of the audio sequence according to the first voice detection result and the second voice detection result.

Figure 7:
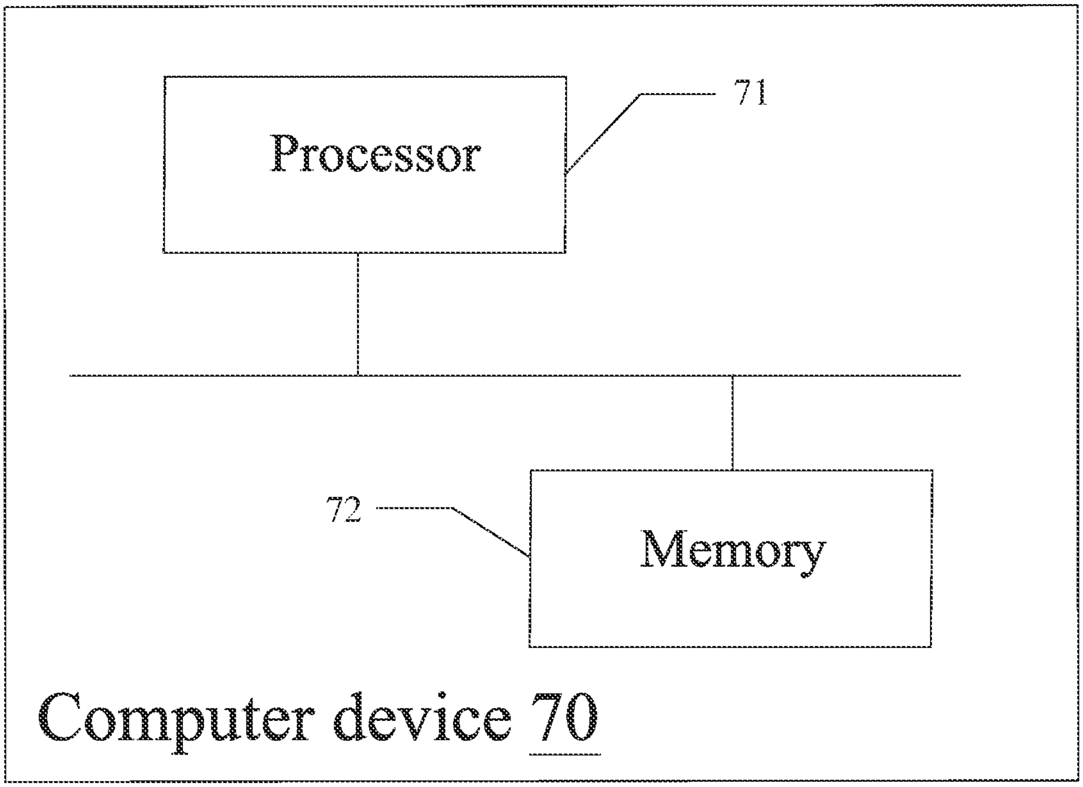
FIG. 7 is a schematic structural diagram of a computer device according to one embodiment of the present disclosure.

As shown in FIG. 7, FIG. 7 is a schematic structural diagram of a computer device according to one embodiment of the present disclosure. The computer device 70 includes a memory 72 and a processor 71. The processor 71 is coupled to the memory 72. The processor 71 stores a computer program. The computer program is executable on the processor. The processor implements the voice detection method when executing the computer program.

The processor 71 may be a central processing unit (CPU), the processor 71 may be an integrated circuit chip with signal processing capabilities, or the processor 71 may also be a general-purpose processor, a digital signal processor (DSP), an application-specific integrated circuit (ASIC), a field programmable gate array (FPGA), another programmable logic device, a discrete gate or transistor logic device, or a discrete hardware component. The general-purpose processor may be a microprocessor or the processor may be any conventional processor.

Figure 8:
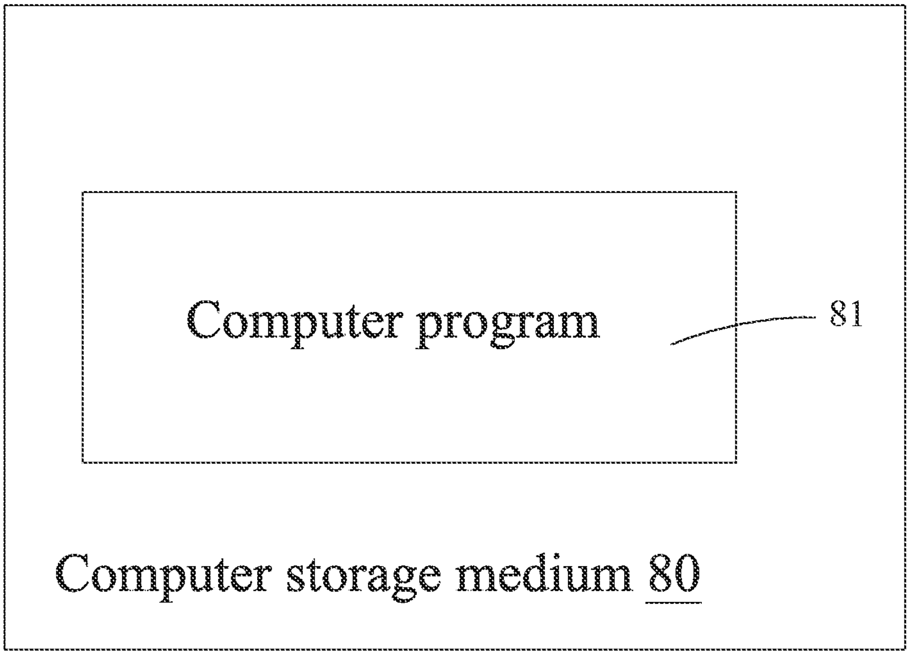
FIG. 8 is a schematic structural diagram of a computer storage medium according to one embodiment of the present disclosure.

As shown in FIG. 8, FIG. 8 is a schematic structural diagram of a computer storage medium according to one embodiment of the present disclosure. The computer storage medium 80 includes a computer program 81 stored therein. When the computer program 81 is executed by the processor, the voice detection method is implemented.

The computer program 81 is stored in the above-mentioned computer storage medium in a form of a software product, and includes a number of instructions to enable the computer device (i.e., a personal computer, a server, or a network device, etc.) or the processor to execute all or part of the steps of the voice detection method described in various embodiments of the present disclosure. The computer storage medium may be a USB flash disk, a mobile hard disk, a read-only memory (ROM), a random access memory (RAM), a magnetic disk or optical disk, etc. that can store program code, or may be a terminal device such as a computer, a server, a mobile phones, a tablet, etc.

In the embodiments of the present disclosure, it should be understood that any disclosed systems, devices, and methods are allowed to be implemented in other ways. For example, the devices in the embodiments described above are only illustrative. For another example, a division of units is only a logical function division. In actual implementation, there may be other division methods. For another example, multiple units or components may be combined or integrated to another system. Alternatively, some features may be omitted or not implemented. In addition, features shown or discussed may be coupled, directly coupled, or communicated with each other through interfaces. Alternatively, the devices or the units may be direct coupled or communicated in electrical, mechanical or other forms.

In addition, functional units in various embodiments of the present disclosure may be integrated into one processing unit, or each of the functional units may separately physically disposed, or two or more functional units may be integrated into one unit. Above integrated unit may be implemented in a form of hardware or a software functional unit.

The above are only embodiments of the present disclosure, and do not limit the patent scope of the present disclosure. Any equivalent structural transformation or equivalent process transformation made based on contents of description and drawings of the present disclosure, or directly or indirectly applied in other related technical fields, are also included in the patent protection scope of the present disclosure.

What is claimed is:

1. A voice detection method, comprising steps:

acquiring an audio sequence;

extracting a first audio feature from the audio sequence, and performing voice detection on the audio sequence according to the first audio feature to obtain a first voice detection result;

extracting a second audio feature from the audio sequence, and performing the voice detection on the audio sequence according to the second audio feature to obtain a second voice detection result; and determining a voice detection result of the audio sequence according to the first voice detection result and the second voice detection result; wherein the first audio feature comprises an average energy an energy ratio, and a zero-crossing rate of an audio signal; the step of extracting the first audio feature from the audio sequence and performing the voice detection on the audio sequence according to the first audio feature to obtain the first voice detection result comprises steps:

performing sampling frequency conversion and framing processing on the audio sequence to obtain frames of audio sub-signals;

calculating an average energy and a zero-crossing rate of each of the frames of the audio sub-signals according to each of the frames of the audio sub-signals to obtain the average energy and the zero-crossing rate of the audio signal;

obtaining energy spectra of the audio sub-signals, obtaining low-frequency band energy and high-band energy according to the energy spectra, and calculating a ratio between an average energy of the low-frequency band energy and an average energy of the high-band energy to obtain the energy ratio of the audio signal; and performing the voice detection on the audio sequence according to the average energy, the zero-crossing rate, and the energy ratio of the audio signal to obtain the first voice detection result;

the step of performing the voice detection on the audio sequence according to the average energy, the zero-crossing rate, and the energy ratio of the audio signal to obtain the first voice detection result comprises steps:

comparing the average energy of the audio signal with a first predetermined threshold;

comparing the energy ratio of the audio signal with a second predetermined threshold;

comparing the zero-crossing rate of the audio signal with a third predetermined threshold; and determining that the first voice detection result is a voice when the average energy of the audio signal is greater than the first predetermined threshold, the energy ratio of the audio signal is greater than the second predetermined threshold, and the zero-crossing rate of the audio signal is greater than the third predetermined threshold;

the second feature comprises a spectral modulation energy; the step of extracting the second audio feature from the audio sequence and performing the voice detection on the audio sequence according to the second audio feature to obtain the second voice detection result comprises steps:

performing the sampling frequency conversion and segmentation processing on the audio sequence to obtain audio segments;

calculating a Mel spectrum for each of the audio segments to obtain a Mel spectrogram containing channels;

performing the fast Fourier transform on each of the channels in the Mel spectrogram, and calculating a normalized modulation energy of each of the channels; and performing the voice detection on the audio sequence according to the normalized modulation energy of each of the channels to obtain the second voice detection result;

the step of performing the voice detection on the audio sequence according to the normalized modulation energy of each of the channels to obtain the second voice detection result comprises steps:

calculating a sum of the normalized modulation energy of each of the channels;

comparing the sum of the normalized modulation energy of each of the channels with a fourth predetermined threshold;

if the sum of the normalized modulation energy of each of the channels is greater than the fourth predetermined threshold, determining that the second voice detection result is the voice; and if the sum of the normalized modulation energy of each of the channels not greater than the fourth predetermined threshold, determining that the second voice detection result is non-voice.

2. The voice detection method according to claim 1, wherein the step of obtaining the energy spectra of the audio sub-signals and obtaining the low-frequency band energy and the high-band energy according to the energy spectra comprises steps obtaining the low-frequency band energy and the high-frequency band energy from a frequency domain through fast Fourier transform; or respectively obtaining a low-frequency signal and a high-frequency signal through a time-domain filter and a predetermined cut-off frequency, and calculating the low-frequency band energy of the low-frequency signal and the high-frequency band of the high-frequency signal;

wherein the step of obtaining the low-frequency band energy and the high-frequency band energy from the frequency domain through the fast Fourier transform comprises:

performing windowing processing on each of the frames of the audio sub-signals to obtain windowing processing results;

respectively performing the fast Fourier transform on the windowing processing results to obtain fast Fourier transform results;

respectively calculating the energy spectra according to the fast Fourier transform results; and counting the high-frequency band energy and the low-frequency band energy from the energy spectra.

3. The voice detection method according to claim 1, wherein the step of determining the voice detection result of the audio sequence according to the first voice detection result and the second voice detection result comprises steps:

determining whether both of the first voice detection result and the second voice detection result are the voice;

if yes, determining that the voice detection result of the audio sequence is the voice; and if no, determining that the voice detection result of the audio sequence is non-voice.

* * * * *